United States Patent
Lim et al.

(10) Patent No.: US 8,795,871 B2
(45) Date of Patent: *Aug. 5, 2014

(54) ELECTRODE ASSEMBLY AND SECONDARY BATTERY HAVING THE SAME

(71) Applicant: Samsung SDI Co., Ltd., Yongin-si (KR)

(72) Inventors: Wan-Mook Lim, Yongin-si (KR); Kyu-Nam Han, Yongin-si (KR); Myung-Ro Lee, Yongin-si (KR)

(73) Assignee: Samsung SDI Co., Ltd., Yongin-si, Gyeonggi-Do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/952,527

(22) Filed: Jul. 26, 2013

(65) Prior Publication Data

US 2013/0316220 A1 Nov. 28, 2013

Related U.S. Application Data

(63) Continuation of application No. 12/276,237, filed on Nov. 21, 2008, now Pat. No. 8,518,577.

(60) Provisional application No. 61/061,297, filed on Jun. 13, 2008.

(51) Int. Cl.
*H01M 2/14* (2006.01)
*H01M 2/16* (2006.01)

(52) U.S. Cl.
CPC .............. *H01M 2/14* (2013.01); *H01M 2/1666* (2013.01); *H01M 2/1686* (2013.01)
USPC .......................................... 429/144; 429/141

(58) Field of Classification Search
CPC .... H01M 2/14; H01M 2/1666; H01M 2/1686
USPC .................................. 429/144, 232, 251, 252
See application file for complete search history.

(56) References Cited

U.S. PATENT DOCUMENTS 7,745,042 B2   6/2010   Fujino et al.
7,838,152 B2   11/2010  Cheon et al.
(Continued)

FOREIGN PATENT DOCUMENTS

CN   1864288 A    11/2006
EP   1 146 576 A1 10/2001
(Continued)

OTHER PUBLICATIONS

Office Action dated Mar. 16, 2011, received in connection with Chinese Application No. 200910145754.5.

(Continued)

*Primary Examiner* — Barbara Gilliam
*Assistant Examiner* — Adam A Arciero
(74) *Attorney, Agent, or Firm* — Knobbe, Martens, Olson & Bear, LLP (57) ABSTRACT

An electrode assembly for a battery. The electrode assembly includes a positive electrode with a positive electrode active material layer and a negative electrode with a negative electrode active material layer. The assembly further includes a separator that has a porous layer formed of a ceramic material and a binder and a polyolefin resin layer. The porous layer has a thickness of about 4 to 6 μm and the polyolefin resin layer has a thickness of about 12 to 16 μm.

20 Claims, 3 Drawing Sheets

(56) References Cited

U.S. PATENT DOCUMENTS

| | | |
|---|---|---|
| 7,883,799 B2 | 2/2011 | Seo et al. |
| 7,981,537 B2 | 7/2011 | Han |
| 8,003,259 B2 | 8/2011 | Inoue et al. |
| 8,062,789 B2 | 11/2011 | Kim et al. |
| 8,518,577 B2 * | 8/2013 | Lim et al. .................. 429/144 |
| 2006/0222955 A1 | 10/2006 | Ogawa et al. |
| 2006/0286446 A1 | 12/2006 | Chun et al. |
| 2007/0009803 A1 | 1/2007 | Kim et al. |
| 2007/0218362 A1 | 9/2007 | Nagasaki et al. |
| 2007/0281206 A1 | 12/2007 | Fujikawa et al. |
| 2009/0067119 A1 | 3/2009 | Katayama et al. |
| 2009/0325058 A1 | 12/2009 | Katayama et al. |

FOREIGN PATENT DOCUMENTS

| | | |
|---|---|---|
| EP | 1 696 499 A1 | 8/2006 |
| EP | 1 947 710 A1 | 7/2008 |
| JP | 07-220759 B2 | 8/1995 |
| JP | 2004-014127 A | 1/2004 |
| JP | 2006-128119 A | 5/2006 |
| JP | 2006-310302 A | 11/2006 |
| JP | 2007-123237 A | 5/2007 |
| JP | 2007-273443 A | 10/2007 |
| JP | 2007-324073 A | 12/2007 |
| JP | 2008-123996 A | 5/2008 |
| KR | 10-2004-0108525 A | 12/2004 |
| KR | 10-2007-0005341 A | 1/2007 |
| KR | 10-2007-0012057 A | 1/2007 |
| KR | 10-2007-0012833 A | 1/2007 |
| WO | WO 2005/104273 A1 | 11/2005 |
| WO | WO 2007/037145 A1 | 4/2007 |
| WO | WO 2008/143005 A1 | 11/2008 |

OTHER PUBLICATIONS

Office Action dated Apr. 20, 2011, received in connection with European Patent Application No. 09161779.5.

Office Action dated Sep. 29, 2010, received in connection with European Patent Application No. 09161779.5.

Search Report dated Sep. 23, 2009, received in connection with European Patent Application No. 09161779.5.

Office Action dated Jul. 24, 2012, received in connection with Japanese Patent Application No. 2009-136727.

Office Action dated Oct. 11, 2010, received in connection with Korean Patent Application No. 10-2009-0033234.

* cited by examiner

ELECTRODE ASSEMBLY AND SECONDARY BATTERY HAVING THE SAME

RELATED APPLICATIONS

This application is a continuation of U.S. patent application Ser. No. 12/276,237 filed Nov. 21, 2008, which claims the benefit of U.S. Provisional Application No. 61/061,297, filed Jun. 13, 2008, the entireties of which are hereby incorporated by reference.

BACKGROUND OF THE INVENTION

1. Field of the Invention

The present invention relates to an electrode assembly and a secondary battery having the same, and more particularly, to a secondary battery that can maximize battery safety without degrading battery performance.

2. Description of the Related Art

In recent years, the rapid development of small and lightweight portable electronic devices has generated an increasing need for high-capacity, small-sized batteries. In particular, lithium ion secondary batteries can provide an operating voltage of at least about 3.6 V, which is about 3 times higher than nickel-cadmium batteries or nickel-hydrogen batteries widely used in portable electronic devices, and they have a higher energy density per unit weight than nickel-cadmium batteries or nickel-hydrogen batteries. For these reasons, research into lithium ion secondary batteries has rapidly progressed.

In a lithium ion secondary battery, electrical energy is generated due to oxidation and reduction reactions, which occur when lithium ions are intercalated/deintercalated at positive and negative electrodes. Fabrication of the lithium ion secondary battery involves using materials capable of reversibly intercalating/deintercalating lithium ions as active materials of the positive and negative electrodes and filling an organic electrolyte or polymer electrolyte between the positive and negative electrodes.

The lithium ion secondary battery includes an electrode assembly in which a negative electrode plate and a positive electrode plate with a separator interposed therebetween are wound in the form of, for example, a jelly-roll, a can for containing the electrode assembly and an electrolyte, and a cap assembly mounted on the can.

Conventionally, a single or multiple polyolefin-based micro-porous polymer layer formed of at least one of polypropylene (PP) and polyethylene (PE) was used as the separator. However, since the polyolefin-based micro-porous polymer layer serving as the separator has a sheet or film shape, when heat is generated due to internal shorting or overcharge, pores may be clogged and the film-type separator may shrink.

Accordingly, when the film-type separator shrinks due to heat generated in the lithium ion secondary battery, portions of the positive and negative electrodes, which are not separated by the shrunk separator, are brought into contact with each other, thereby causing ignition, bursting, or explosion.

In order to make up for these weak points in the film-type separator, a considerable amount of research has focused on forming a ceramic separator using a porous layer formed of a combination of a binder and a ceramic material, such as silica ($SiO_2$), alumina ($Al_2O_3$), zirconium oxide ($ZrO_2$), or titanium oxide ($TiO_2$).

In this case, the ceramic separator may make up for the fusion and shrinkage of a film-type polyolefin separator at a high temperature of about 120° C. or higher. As a result, there is a growing tendency to use both a conventional film-type separator and a ceramic separator.

However, when both the film-type separator and the ceramic separator are used, battery safety is improved, but the film-type separator must be as thin as the ceramic separator in order to obtain the same cell capacity as a conventional secondary battery.

In detail, when a ceramic layer has a predetermined thickness or less, the safety of the ceramic layer is not improved, while when the ceramic layer exceeds the predetermined thickness, battery performance is deteriorated. In addition, when the film-type separator has less than a predetermined thickness, the thermal characteristics of the secondary battery are deteriorated, and when the film-type separator is too thick, battery performance is deteriorated.

Accordingly, it is necessary to optimally design a lithium ion secondary battery in consideration of compatibility between the film-type separator and the ceramic separator so as to maximize battery safety without degrading battery performance.

SUMMARY OF THE INVENTION

The present invention provides a secondary battery that can maximize battery safety without degrading battery performance.

Also, the present invention provides a secondary battery that is excellent in capacity retention rate, thermal exposure characteristic, and mechanical stability.

According to an aspect of the present invention, an electrode assembly includes two electrode plates and a separator for separating the two electrode plates from each other. The separator includes a porous layer formed of a combination of a ceramic material and a binder, and a polyolefin resin layer. Moreover, the porous layer has a thickness of about 4 to 6 μm, and the polyolefin resin layer has a thickness of about 12 to 16 μm.

According to another aspect of the present invention, an electrode assembly includes: a positive electrode including a positive electrode active material layer; a negative electrode including a negative electrode active material layer; and a separator for separating the positive and negative electrodes from each other. The separator includes a porous layer formed of a combination of a ceramic material and a binder, and a polyolefin resin layer. Moreover, the porous layer has a thickness of about 4 to 6 μm, and the polyolefin resin layer has a thickness of about 12 to 16 μm.

According to yet another aspect of the present invention, a secondary battery includes: an electrode assembly including a positive electrode having a positive electrode active material layer, a negative electrode having a negative electrode active material layer, and a separator for separating the positive and negative electrodes from each other; and an electrolyte. The separator includes a porous layer formed of a combination of a ceramic material and a binder, and a polyolefin resin layer. Moreover, the porous layer has a thickness of about 4 to 6 μm, and the polyolefin resin layer has a thickness of about 12 to 16 μm.

The polyolefin resin layer may include a polyethylene (PE) single layer, a polypropylene (PP) single layer, or a PP-PE-PP triple layer.

The ceramic material may include at least one selected from the group consisting of silica ($SiO_2$), alumina ($Al_2O_3$), zirconium oxide ($ZrO_2$), and titanium oxide ($TiO_2$).

The binder may include a synthetic rubber latex binder or an acryl rubber binder having a crosslinking structure.

The separator may be disposed in at least one of the positive electrode having the positive electrode active material layer and the negative electrode having the negative electrode active material layer.

In the separator, the porous layer may be coated on the positive electrode active material layer or the negative electrode active material layer, and the polyolefin resin layer may be disposed on the porous layer.

Alternatively, in the separator, the polyolefin resin layer may be disposed on the positive electrode active material layer or the negative electrode active material layer, and the porous layer may be coated on the polyolefin resin layer.

DETAILED DESCRIPTION OF THE INVENTION

The present invention will now be described in detail with reference to exemplary embodiments thereof.

An electrode assembly having a separator and a secondary battery including the electrode assembly according to exemplary embodiments of the present invention will now be described.

Figure 1:
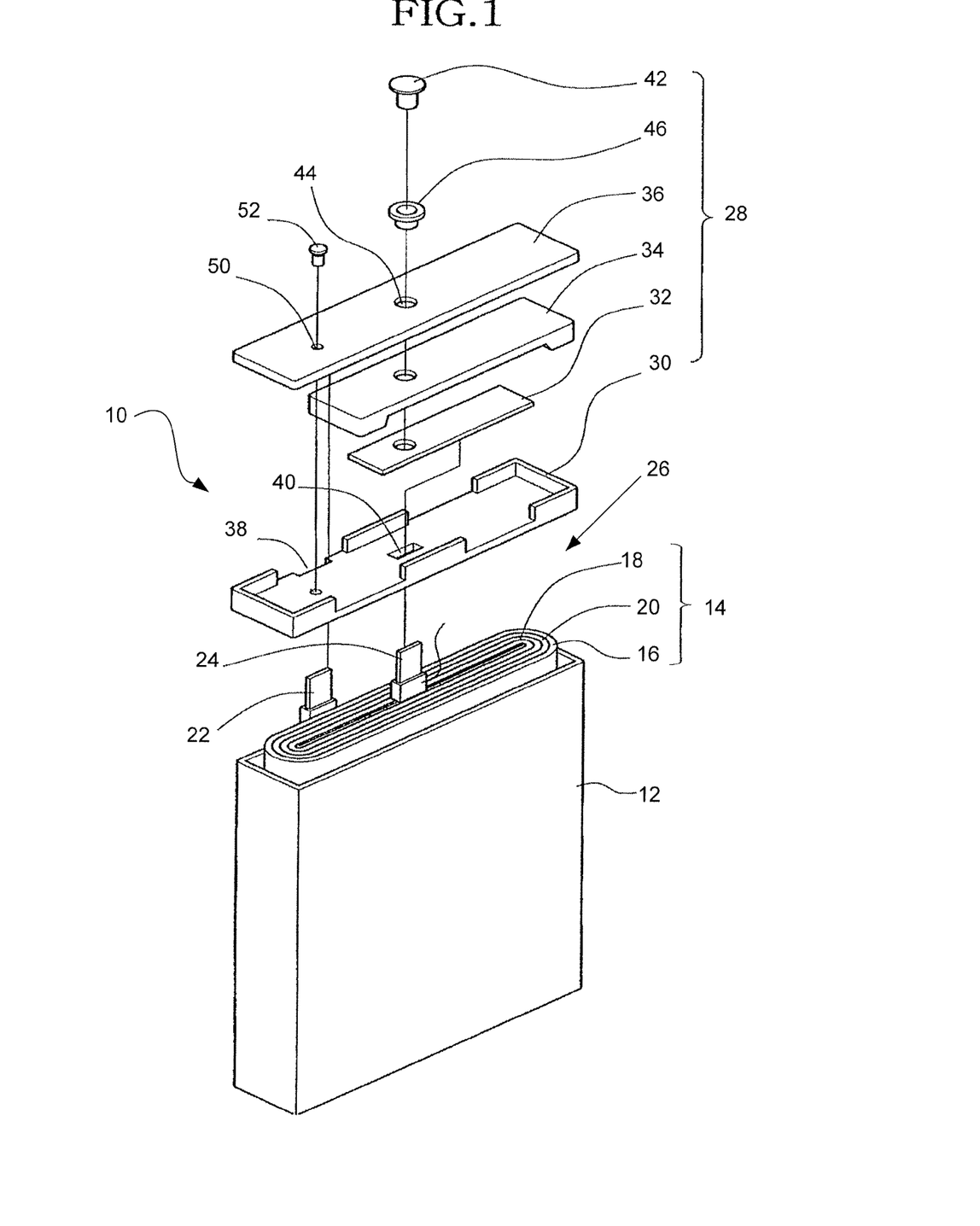
FIG. 1 is an exploded perspective view of one embodiment of a battery assembly.

An exemplary battery assembly 10 is shown in FIG. 1. The battery assembly 10 includes a can 12 that contains an electrode assembly 14. The electrode assembly 14 includes a first electrode plate 16, a second electrode plate 18 with a separator 20 interposed therebetween. The electrode assembly 14 is generally rolled together in a jelly roll fashion in a manner known in the art. A first electrode tab 22 and a second electrode tab 24 are respectively connected to the first electrode plate 16 and the second electrode plate 18. An open end 26 of the can 12 is enclosed by a cap assembly 28 in a known manner.

The cap assembly 28 includes an insulating case 30, a terminal plate 32, an insulating plate 34 and a cap plate 36. The insulating plate 34 defines a tab groove 38 that receives the first electrode tab 22 and a tab aperture 40 that receives the second electrode tab 24. The insulating case 30 provides insulation between the two electrode tabs 22 and 24. The second electrode tab 24 couples to the terminal plate 32 and an electrode terminal 42 also couples to the terminal plate 32 and second electrode tab 24 via a terminal through aperture 44 in the cap plate 36, the insulating plate 34 and the terminal plate 32. The first electrode tab 22 is coupled to the cap plate 36 via the tab groove 38 and is insulated from the second electrode tab 24 and the terminal plate 32 by the insulating plate 34. The electrode terminal 42 is further insulated via an insulating gasket 46 that is positioned in the terminal through aperture 44. As is also shown, there is an electrolyte injection hole 50 formed in the cap plate 36 and the insulating case 30 to allow electrolyte to be positioned in the can 12 in a manner known in the art. Further, a stopper 52 is used to seal the injection hole 50.

The bare cell 10 illustrated in FIG. 1 is simply an exemplary battery. It will be appreciated from the following discussion that any of a number of different battery configurations can be implemented with the present invention without departing from the scope of the present invention.

Figure 2A:
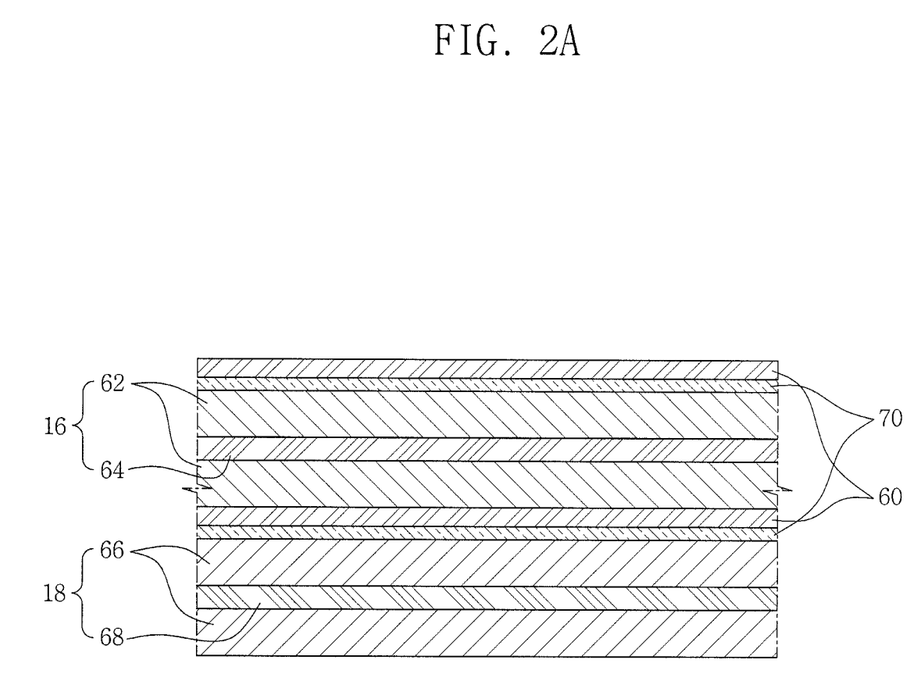
FIGS. 2A and 2B are cross sectional views of the battery assembly of FIG. 1 illustrating the electrode assembly and separator layers.
Figure 2B:
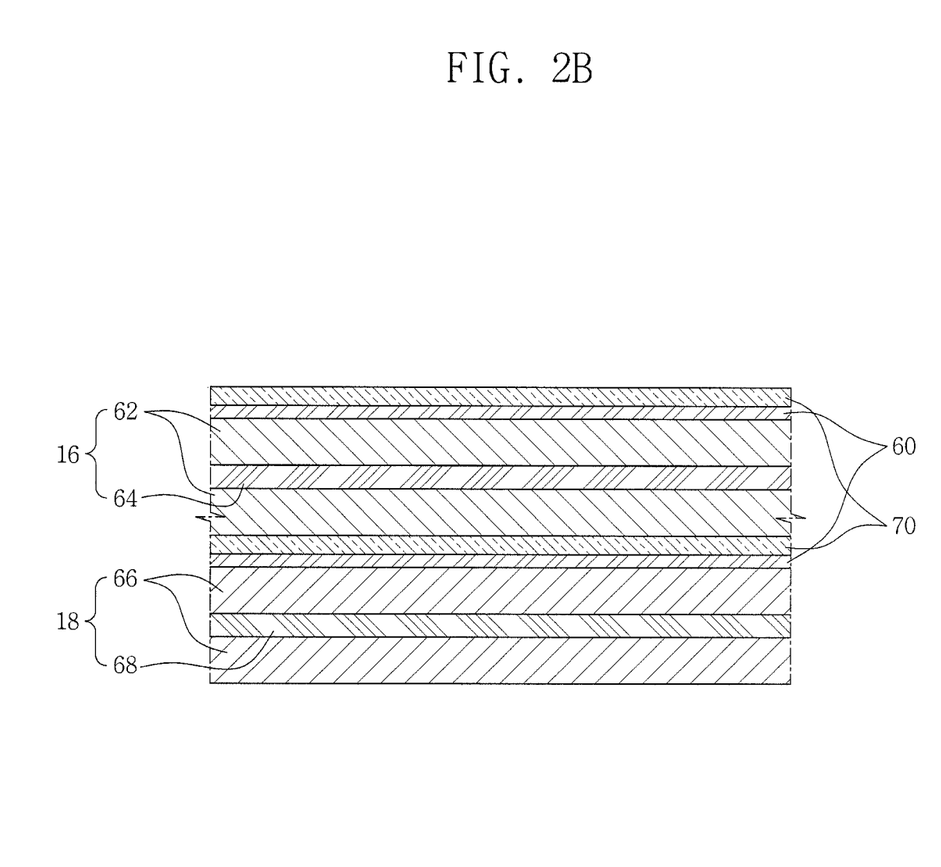

As shown in FIGS. 2A and 2B, the separator 20 according to the present invention includes a porous layer 60 formed of a combination of a ceramic material and a binder, and a polyolefin resin layer 70. As shown by comparing FIG. 2A to FIG. 2B, the order of the porous layer 60 and polyolefin layer 70 can be reversed without departing from the spirit of the present invention. More specifically, as shown in FIGS. 2A and 2B, the first electrode 16 includes an active material layer 62 that surrounds a collector 64. Similarly, the second electrode also includes an active material layer 66 that surrounds a collector 68. The porous layer 60 can either be positioned on the active material 62 of the first electrode 16 and the polyolefin resin layer 70 can then be positioned on the porous layer 60 as shown in FIG. 2A, or the polyolefin resin layer 70 can be positioned on the active material 62 of the first electrode 16 with the porous layer 60 then positioned on the polyolefin resin layer 70 as shown in FIG. 2B.

That is, according to the present invention, both the porous layer 60 and the polyolefin resin layer 70 function as the separator 20 in the secondary battery.

To begin with, the polyolefin resin layer 70 may include a polyethylene (PE) single layer, a polypropylene (PP) single layer, or a PP-PE-PP triple layer. However, the present invention is not limited to the above-described kinds and shapes of the polyolefin resin layer 70.

Next, the porous layer 60 may be formed of a combination of a ceramic material and a binder.

The ceramic material may include at least one selected from the group consisting of silica ($SiO_2$), alumina ($Al_2O_3$), zirconium oxide ($ZrO_2$), and titanium oxide ($TiO_2$). Alternatively, the ceramic material may include one selected from the group consisting of insulating nitride, hydroxide, and a ketone of each of zirconium, aluminum, silicon, and titanium, and a mixture thereof. The insulating nitride is mentioned because a conductive nitride, such as titanium nitride (TiN), is not appropriate for the ceramic material according to the present invention.

The binder may include a synthetic rubber latex binder or an acryl rubber binder with a crosslinking structure.

The synthetic rubber latex binder may include at least one polymer latex selected from the group consisting of styrene butadiene rubber (SBR) latex, nitrile butadiene rubber (NBR) latex, methyl methacrylate butadiene rubber latex, chloroprene rubber latex, carboxylated styrene-butadiene rubber latex, and modified polyorganosiloxane-based polymer latex. The polymer latex may include an aqueous dispersant. 0.1 to 20 parts by weight polymer latex solid may be contained based on 100 parts by weight electrode active material. When less than 0.1 parts by weight polymer latex solid is used, adhesion of the porous layer 60 to a collector may be unreliable. When more than 20 parts by weight polymer latex solid is used, the polymer latex may adversely affect battery characteristics.

Also, the acryl rubber binder having the crosslinking structure may be obtained by a crosslinking reaction of a polymer or co-polymer of an acryl main monomer with a crosslinking co-monomer. When only the polymer or co-polymer of the acryl main monomer is used, a coupling structure may be weak and easily cut. However, when the polymer or co-polymer of the acryl main monomer combines with the crosslinking co-monomer due to the cross-linking reaction, a tighter net structure can be formed. As cross-linking degree increases, it becomes more difficult to swell a polymer having a net structure in a solvent. The acryl rubber binder having the cross-linking structure may have a 3-dimensional cross-linking structure having 2 to 10 cross-linking points, and more specifically, 4 to 5 cross-linking points, based on 10,000 molecular weight units of a main chain molecule. Thus, the acryl rubber binder having the cross-linking structure according to the present invention may have good resistance to swelling in the electrolyte.

The ceramic material may decompose at a temperature of about 1000° C. or higher, and the binder may be the acryl rubber binder having the cross-linking structure, which may decompose at a temperature of about 250° C. or higher. Thus, the heat resistance of the secondary battery can be increased to improve battery safety with regard to internal short-circuiting.

The acryl main monomer may include at least one selected from the group consisting of: one alkoxyalkyl acrylate selected from the group consisting of methoxymethyl acrylate, methoxyethyl acrylate, ethoxyethyl acrylate, buthoxyethylacrylate, methoxyethoxyethyl acrylate, and dicyclopentenyloxyethyl acrylate; one alkenyl acrylate or alkenyl methacrylate selected from the group consisting of vinyl methacrylate, vinyl acrylate, allyl methacrylate, 1,1-dimethylpropenyl methacrylate, 1,1-dimethylpropenyl acrylate, 3,3-dimethylbutenyl methacrylate, and 3,3-dimethylbutenyl acrylate; one unsaturated dicarboxylic acid ester selected out of divinyl itaconate and divinyl maleate; one vinyl ether selected out of vinyl 1,1-dimethylpropenyl ether and vinyl 3,3-dimethylbutenyl ether; 1-acryloyloxy-1-phenylethene; and methyl methacrylate.

The cross-linking co-monomer may include at least one selected from the group consisting of: one alkyl acrylate selected from the group consisting of 2-ethylhexyl acrylate, methyl acrylate, ethyl acrylate, propyl acrylate, buthyl acrylate, octyl acrylate, and iso-octyl acrylate; one alkenyl chloroacetate selected out of vinyl chloroacetate and acryl chloroacetate; one glycidyl ester or ether selected from the group consisting of glycidyl acrylate, vinylglycidyl ether, and acryl glycidyl ether; one unsaturated carboxylic acid selected from the group consisting of acrylic acid, methacrylic acid, and maleic acid; 2-chloroethyl vinyl ether; chloromethyl styrene; and acrylonitrile.

The separator 20 including the porous layer 60 formed of a combination of the ceramic material and the binder and the polyolefin resin 70 layer may have a thickness of about 16 to 22 μm.

When the separator 20 has a thickness of less than 16 μm, it is difficult to separate positive and negative electrodes 18 and 16 from each other so as to prevent short-circuiting. When the separator 20 has a thickness of more than 22 μm, the thickness of a construction having a cell capacity is reduced for a secondary battery having the same size. Thus, the cell capacity of the secondary battery 10 may be reduced.

In this case, the porous layer 60, which corresponds to a ceramic separator, may have a thickness of about 4 to 6 μm, and the polyolefin resin layer 70, which corresponds to a film-type separator, may have a thickness of about 12 to 16 μm.

When the porous layer 60 has a thickness of less than 4 μm, the mechanical stability of the secondary battery may be degraded. By comparison, when the porous layer 60 has a thickness of more than 6 μm, the mechanical stability may be improved. However, since the thickness of the polyolefin resin layer 70 is relatively reduced, the thermal exposure characteristic of the secondary battery may be deteriorated. In addition, the porous layer 60 formed of the ceramic material has a higher resistance than the polyolefin resin layer 70, thereby shortening the lifespan of the secondary battery.

When the polyolefin resin layer 70 has a thickness of less than 12 μm, the thermal exposure characteristic may be degraded. By comparison, when the polyolefin resin layer 70 has a thickness of more than 16 μm, since the thickness of the porous layer 60 is relatively reduced, the mechanical stability of the lithium ion secondary battery may be deteriorated, and a resistive layer may be thickened, thereby reducing the lifespan of the lithium ion secondary battery.

Therefore, the porous layer 60 (i.e., the ceramic separator) may have a thickness of about 4 to 6 μm, and the polyolefin resin layer 70 (i.e., the film-type separator) may have a thickness of about 12 to 16 μm.

Subsequently, the electrode assembly 14 with the separator 20 and the secondary battery 10 having the electrode assembly 14 include the positive electrode 18 and negative electrodes 16.

The positive electrode 18 may include a positive electrode active material 66 capable of reversibly intercalating and deintercalating lithium ions. Typical examples of the positive electrode active material 66 may be lithium-transitional metal oxides, such as $LiCoO_2$, $LiNiO_2$, $LiMnO_2$, $LiMn_2O_4$, and $LiNi_{1-x-y}Co_xM_yO_2$ ($0 \leq x \leq 1$, $0 \leq y \leq 1$, $0 \leq x+y \leq 1$, M is a metal, such as Al, Sr, Mg, or La). However, the present invention is not limited to the above-described kinds of positive electrode active materials 66.

The negative electrode 16 may include a negative electrode active material 62 capable of reversibly intercalating and deintercalating lithium ions. The negative electrode active material 62 may include a carbon-based negative electrode active material, such as crystalline or amorphous carbon or a carbon composite. However, the present invention is not limited to the above-described kinds of negative electrode active materials 62.

Each of the positive 18 and negative electrodes 16 may further include a conductive agent in order to improve electrical conductivity. The conductive agent may include at least one selected from the group consisting of graphite, carbon black, a metal conductive agent, and a metal compound conductive agent. The graphite may be, for example, artificial graphite and natural graphite. The carbon black may be, for example, acetylene black, ketjen black, denka black, thermal black, and channel black. The metal or metal compound conductive agent may be, for example, tin (Sn), tin oxide, tin phosphate ($SnPO_4$), titanium oxide, potassium titanate, and a perovskite material, such as $LaSrCoO_3$ and $LaSrMnO_3$.

A binder for an electrode active material may aid in forming a paste of the electrode active material, adhering electrode active materials to each other, adhering the electrode active material to a collector, and alleviating the expansion and contraction of the electrode active material. For example, the binder for an electrode active material may include poly(vinylidene fluoride), a polyhexafluoropropylene-poly(vinylidene fluoride) co-polymer (P(VdF/HFP)), poly(vinylacetate), polyvinyl alcohol, polyethyleneoxide (PEO), polyvinyl pyrrolidone, alkylated poly(ethylene oxide), polyvinyl ether, poly(methyl methacrylate) (PMMA), poly(ethyl methacrylate) (PEMA), poly(tetrafluoroethylene) (PTFE), polyvinyl chloride (PVC), polyacrylonitrile (PAN), polyvinylpyridine, styrene-butadiene rubber, and acrylonitrile-butadiene rubber. 0.1 to 30 wt. % (more specifically, 1 to 10 wt. %) of the binder, based on the total weight of the electrode active material, may be used. When less than 0.1 wt. % of the binder is used, adhesion of the electrode active material to the collector may be unreliable. Also, when more than 30 wt. % of the binder is used, a reliable adhesion of the electrode active material to the collector may be ensured. However, since the content of the electrode active material is relatively reduced, it becomes more difficult to increase the capacity of the lithium ion secondary battery.

A dispersion solvent used for dispersing the electrode active material, the binder, and the conductive agent may be a nonaqueous solvent or an aqueous solvent. The nonaqueous solvent may include N-methyl-2-pyrrolidone (NMP), N,N-dimethylformamide (DMF), dimethylacetamide (DMAC), N,N-dimethylaminopropylamine, ethylene oxide, or tetrahydrofuran (THF).

The porous layer 60 according to the present invention may be formed on the negative electrode 16. In this case, when a binder forming the negative electrode active material 62 is an aqueous binder (e.g., styrene-butadiene rubber), the binder forming the porous layer 60 may be an organic binder, and when the binder forming the negative electrode active material 62 is an organic binder (e.g., poly(vinylidene fluoride)), the binder forming the porous layer 60 may be an aqueous binder. When the negative electrode active material layer 62 and the porous layer 60 are formed of the same organic or aqueous binder, the same organic or aqueous solvent must be used as the dispersion solvent for dispersing the binder. In this case, when a porous paste is coated on the negative electrode active material layer 66, the dried negative electrode active material 62 may dissolve again in a solvent of the porous paste.

When an organic binder is used for the porous layer 60, the solvent of the porous paste may be obtained by mixing N-Methylpyrrolidone or NMP and cyclohexanone in a weight ratio of 0:100 to 50:50, for example, 30:70. In this case, NMP may be replaced by isopropyl alcohol, toluene, or xylene. When the binder forming the negative electrode active material layer 62 is an organic binder, the binder forming the porous paste may be an aqueous binder, and the solvent of the porous paste may be water.

Also, the positive electrode 18 may include a positive electrode collector 68, which may be formed of aluminum (Al) or an Al alloy. The negative electrode 16 may include a negative electrode collector 64, which may be formed of copper (Cu) or a Cu alloy. Each of the positive and negative electrode collectors 68 and 67 may be provided in the form of a foil, a film, a sheet, a punched structure, a porous structure, or a foam structure.

As described above, in the present invention, both the porous layer 60 and the polyolefin resin layer 70 may function as the separator 20 in the secondary battery 10. Also, the porous layer 60 and the polyolefin resin 70 layer may be formed on at least one of the positive 18 and negative electrodes 16, and the positive and negative electrodes 18 and 16 may be stacked, or both stacked and wound, to form an electrode group.

In this case, after the porous layer 60 is coated on the positive electrode active material layer 66 or the negative electrode active material layer 62, the polyolefin resin layer 70 may be disposed on the porous layer 60 in the manner shown in FIG. 2B. Alternatively, after the polyolefin resin layer 70 is disposed on the positive electrode active material layer 66 or the negative electrode active material layer 62, the porous layer 60 may be coated on the polyolefin resin layer 70. However, the present invention is not limited to the above-described order of the stacking of the porous layer 60 and the polyolefin resin layer 70.

The polyolefin resin layer 70, which corresponds to a film-type separator, shrinks at a high temperature, while the porous layer 60, which corresponds to a ceramic separator, neither shrinks nor melts at a high temperature. In the case of the polyolefin resin separator 70, when internal shorting occurs, portions adjacent to a damaged portion caused by initial heat generation keep shrinking or melting so that a burnt portion of the film-type separator expands, thus resulting in a more severe short. In contrast, the positive and/or negative electrodes 18 and 16 on which the porous layer 60 is formed are only slightly damaged by internal shorting, and the damaged portion does not expand.

Therefore, according to the present invention, the ceramic separator which is the porous layer 60 may make up for the fusion and shrinkage of the film-type separator formed of the polyolefin resin layer 70 at a high temperature of about 120° C. or higher. In particular, the thicknesses of the ceramic separator and the film-type separator are limited, thereby maximizing battery safety without degrading battery performance.

Next, the secondary battery including the electrode assembly 14 having the separator 20 according to the present invention includes an electrolyte.

According to the present invention, the electrolyte may contain a nonaqueous organic solvent. The nonaqueous organic solvent may be carbonate, ester, ether, or ketone. The carbonate may be dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), or butylene carbonate (BC). The ester may be butyrolactone (BL), decanolide, valerolactone, mevalonolactone, caprolactone, n-methyl acetate, n-ethyl acetate, or n-propyl acetate. The ether may be dibutyl ether, and the ketone may be polymethylvinyl ketone. However, the present invention is not limited to the above-described kinds of nonaqueous organic solvents.

When the nonaqueous organic solvent is a carbonate organic solvent, a mixture of a cyclic carbonate and a chain carbonate may be used as the nonaqueous organic solvent. In this case, the cyclic carbonate may be mixed with the chain carbonate in a volume ratio of 1:1 to 1:9, more specifically, a volume ratio of 1:1.5 to 1:4, in order to obtain good electrolyte performance.

The electrolyte according to the present invention may be obtained by adding an aromatic hydrocarbon organic solvent to the carbonate solvent. The aromatic hydrocarbon organic solvent may be an aromatic hydrocarbon compound.

For example, the aromatic hydrocarbon organic solvent may be benzene, fluorobenzene, chlorobenzene, nitrobenzene, toluene, fluorotoluene, trifluorotoluene, or xylene. When the electrolyte further contains the aromatic hydrocarbon organic solvent, the carbonate organic solvent may be mixed with the aromatic hydrocarbon organic solvent in a volume ratio of 1:1 to 30:1 in order to obtain good electrolyte performance.

Furthermore, the electrolyte according to the present invention may contain lithium salts, which function as a source of lithium ions to enable basic operation of the lithium ion secondary battery. For example, the lithium salts may include one selected from the group consisting of $LiPF_6$, $LiBF_4$, $LiSbF_6$, $LiAsF_6$, $LiClO_4$, $LiCF_3SO_3$, $LiN(CF_3SO_2)_2$, $LiN(C_2F_5SO_2)_2$, $LiAlO_4$, $LiAlCl_4$, $LiN(C_xF_{2x+1}SO_2)$ $(C_yF_{2y+1}SO_2)$ (here, x and y are natural numbers), $LiSO_3CF_3$, and a mixture thereof.

The lithium salts may be used in a concentration of about 0.6 to 2.0M, more specifically, 0.7 to 1.6M. When the concentration of the lithium salts is less than 0.6M, the electrolyte has low conductivity and does not exhibit good performance. When the concentration of the lithium salts is more than 2.0M, the electrolyte has high viscosity and reduces the mobility of lithium ions.

According to the present invention, the above-described separator 20 is interposed between the positive and negative electrodes 18 and 16, and the positive and negative electrodes 18 and 16 are stacked, or both stacked and wound, to form an electrode group. Thereafter, the electrode group is inserted into a can or similar case and then the electrolyte is injected thereinto, thereby completing fabrication of the lithium ion secondary battery.

Also, the secondary battery fabricated according to the above-described method may have a cylindrical shape, a square shape, or a pouch shape, but not limited thereto.

Hereinafter, exemplary embodiments according to the present invention and comparative examples will be described. This invention may, however, be embodied in different forms and should not be construed as limited to the exemplary embodiments set forth herein.

Embodiment 1

$LiCoO_2$ as a positive electrode active material, polyvinylidene fluoride (PVDF) as a binder, and carbon as a conductive agent were mixed in a weight ratio of 92:4:4 and dispersed in N-methyl-2-pyrrolidone (NMP), thereby producing positive electrode slurry. The positive electrode slurry was coated on a 20 μm-thick aluminum foil, dried, and rolled to form a positive electrode. Artificial graphite as a negative electrode active material, styrene-butadiene rubber as a binder, and carboxymethylcellulose (CMC) as a viscosity agent were mixed in a weight ratio of 96:2:2 and dispersed in water, thereby producing negative electrode slurry. The negative electrode slurry was coated on a 15 μm-thick copper foil, dried, and rolled to form a negative electrode.

A separator including a porous layer formed of a combination of a ceramic material and a binder, and a polyolefin resin layer was interposed between the positive and negative electrodes. The positive and negative electrodes with the separator interposed therebetween were wound, compressed, and inserted into a cylindrical can.

The porous layer was formed to a thickness of about 4 μm, and the polyolefin resin layer was formed to a thickness of about 12 μm.

Thereafter, an electrolyte was injected into the cylindrical can to complete fabrication of a lithium ion secondary battery.

Embodiment 2

The same process as in Embodiment 1 was performed except that a polyolefin resin layer was formed to a thickness of about 16 μm.

Embodiment 3

The same process as in Embodiment 1 was performed except that a porous layer was formed to a thickness of about 6 μm.

Embodiment 4

The same process as in Embodiment 1 was performed except that a porous layer was formed to a thickness of about 6 μm, and a polyolefin resin layer was formed to a thickness of about 16 μm.

Comparative Example 1

The same process as in Embodiment 1 was performed except that a porous layer was formed to a thickness of about 2 μm, and a polyolefin resin layer was formed to a thickness of about 20 μm.

Comparative Example 2

The same process as in Embodiment 1 was performed except that a polyolefin resin layer was formed to a thickness of about 10 μm.

Comparative Example 3

The same process as in Embodiment 1 was performed except that a polyolefin resin layer was formed to a thickness of about 18 μm.

Comparative Example 4

The same process as in Embodiment 1 was performed except that a porous layer was formed to a thickness of about 8 μm, and a polyolefin resin layer was formed to a thickness of about 10 μm.

Comparative Example 5

The same process as in Embodiment 1 was performed except that a porous layer was formed to a thickness of about 6 μm, and a polyolefin resin layer was formed to a thickness of about 10 μm.

Comparative Example 6

The same process as in Embodiment 1 was performed except that a porous layer was formed to a thickness of about 6 μm, and a polyolefin resin layer was formed to a thickness of about 18 μm.

Each of lithium ion secondary batteries fabricated according to Embodiments 1 through 4 and Comparative examples 1 through 6 was charged to a cut-off charge voltage of 4.2V under constant current-constant voltage (CC-CV) at a charge/discharge rate of 0.5 C and discharged to a cut-off discharge voltage of 3V under CC at a charge/discharge rate of 1 C. The charge-discharge cycle was performed 100 times, and a capacity retention rate obtained during a 100th charge-discharge cycle was calculated to measure a percentage (%) of a $100^{th}$ capacity to a first capacity.

Also, the collision characteristics of each of the lithium ion secondary batteries fabricated according to Embodiments 1 through 4 and Comparative examples 1 through 6 were measured. The collision characteristics were measured using a standard-charge lithium ion secondary battery. In detail, each of the lithium ion secondary batteries was horizontally put on a flat iron plate, and a rod with a diameter of 15.8 mm was located on the lithium ion secondary battery such that axial directions are perpendicular to each other. Thereafter, a weight with a mass of 9.1 kg was freely dropped from a height of 610±25 mm on the rod so that the rod could collide with the lithium ion secondary battery. In this case, a thermoelectric thermometer was attached to a bottom of the lithium ion secondary battery to measure a variation in surface temperature of the battery and a change of the battery after the collision of the rod with the battery.

In order to pass a collision test, the lithium ion secondary battery must be maintained at a level L1 or lower. Specifically, a level L0 is a state where no change occurs, a level L1 is a state where a leakage occurs, a level L2 is a state where the surface temperature of the battery is lower than 200° C. and smoke is emitted, a level L3 is a state where the surface temperature of the battery is 200° C. or higher and smoke is emitted, a level L4 is a state where ignition occurs, and a level L5 is a state where bursting or explosion occurs.

After the collision characteristics of each of the lithium ion secondary batteries were measured, when the battery was at the level L1 or lower, the result was indicated as "OK", and when the battery was at the level L2 or higher, the result was indicated as "NG".

In addition, the thermal exposure characteristics of each of the lithium ion secondary batteries fabricated according to Embodiments 1 through 4 and Comparative examples 1 through 6 were measured. In detail, a standard-charge lithium ion secondary battery was loaded in a chamber, heated from a normal temperature to a temperature of about 130° C. at a temperature rising rate of 5° C./min, and maintained at a temperature of about 130° C. for 1 hour while observing a change of the battery. In order to pass a thermal exposure test, the lithium ion secondary battery must be maintained at a level L1 or lower at a temperature of about 130° C. for more than 10 minutes.

Specifically, a level L0 is a state where no external change occurs, a state where no leakage occurs and only a flashlight is observed, or a state where the battery remains airtight and is deformed due to test shock. A level L1 is a state where a part of the contents (e.g., an electrolyte) of the battery is lost so that at least 0.1% of the initial weight of the battery is reduced, a state where a portion (e.g., a vent) that may be broken due to a weak point in design is broken, or a state where a trace of jet of, for example, the electrolyte is externally observed by the naked eye. In order to confirm a leakage, after the corresponding test is performed, the weight of the battery must be measured and compared with the initial weight. However, in the case of a safety test, processes of measuring and comparing the weight of the battery may be omitted. In addition, the level L1 may be a state where a mechanism of the battery is broken due to test shock and the electrolyte leaks without being accompanied by emission of smoke, jet of gas, or ignition. A level L2 is a state where the surface temperature of the battery is lower than about 200° C. and smoke is emitted without being accompanied by thermal-runaway. For example, at the level L2, steam may be generated from the inside of the battery. A level L3 is a state where smoke is emitted, accompanied by thermal-runaway, the surface temperature of the battery exceeds 200° C., and gas is severely emitted or a state where even if a trace of smoke is not externally observed, the surface temperature of the battery exceeds 200° C. due to thermal-runaway. A level L4 is a state where the contents of the battery spontaneously ignite, flame, and continuously burn with intense flame or a state where ignition is assumed based on burned traces left in the external casing of the battery. A level L5 is a state where an internal structure is discharged due to an internal pressure of the battery and a portion of a battery case other than the portion that may be broken due to a weak point in design is broken so that fragments of the broken case are exhausted.

After the thermal exposure characteristics of each of the lithium ion secondary batteries were measured, when the battery was at the level L1 or lower, the result was indicated as "OK", and when the battery was at the level L2 or higher, the result was indicated as "NG".

The measurement results are arranged in Table 1.

TABLE 1

| Division | Thickness of porous layer (μm) | Thickness of polyolefin resin layer (μm) | Percentage of $100^{th}$ capacity to first capacity (%) | Collision characteristic | Thermal exposure characteristic |
| --- | --- | --- | --- | --- | --- |
| Embodiment 1 | 4 | 12 | 93 | OK | OK |
| Embodiment 2 | 4 | 16 | 92 | OK | OK |
| Comparative example 1 | 2 | 20 | 89 | NG | OK |
| Comparative example 2 | 4 | 10 | 94 | OK | NG |
| Comparative example 3 | 4 | 18 | 87 | OK | OK |
| Embodiment 3 | 6 | 12 | 92 | OK | OK |
| Embodiment 4 | 6 | 16 | 91 | OK | OK |
| Comparative example 4 | 8 | 10 | 85 | OK | NG |
| Comparative example 5 | 6 | 10 | 93 | OK | NG |
| Comparative example 6 | 6 | 18 | 86 | OK | OK |

Referring to Table 1, on comparing Embodiment 1 with Comparative example 1, although the sum of the thicknesses of the porous layer and the polyolefin resin layer was greater in Comparative example 1 than in Embodiment 1, the lithium ion secondary battery fabricated according to Embodiment 1 obtained better results. As a result, it can be seen that when the thickness of the porous layer was 4 μm or more, mechanical safety reflected by the collision characteristic was good.

On comparing Embodiment 1 with Comparative example 2, it can be seen that when the polyolefin resin layer was too thin (10 μm or less), the thermal exposure characteristic of the battery was degraded. The polyolefin resin layer melts and absorbs heat at a high temperature. However, when the polyolefin resin layer has a thickness of 10 μm or less, it is expected that an endothermic reaction may be reduced, thereby degrading the thermal exposure characteristic.

On comparing Embodiment 2 with Comparative example 3, when the polyolefin resin layer was too thick (18 μm or more), a resistive layer thickened, thereby shortening the lifespan of the lithium ion secondary battery.

On comparing Embodiment 4 with Comparative example 4, although the sum of the thicknesses of the porous layer and the polyolefin resin layer was greater in Embodiment 4 than in Comparative example 4, the lifespan of the lithium ion secondary battery was shorter in Comparative example 4 than in Embodiment 4. This may be because the porous layer is more resistive than the polyolefin resin layer.

On comparing Embodiment 3 with Comparative example 5, like when Embodiment 1 was compared with Comparative example 2, when the thickness of the polyolefin resin layer was 10 μm or less, the thermal exposure characteristic of the battery was degraded. The polyolefin resin layer melts and absorbs heat at a high temperature. However, when the polyolefin resin layer has a thickness of 10 µm or less, it is expected that an endothermic reaction may be reduced, thereby degrading the thermal exposure characteristic. That is, even if the porous layer was thick, the same result was obtained.

On comparing Embodiment 4 with Comparative example 6, when the polyolefin resin layer was too thick (18 µm or more), a resistive layer thickened, thereby shortening the lifespan of the lithium ion secondary battery.

Therefore, according to the present invention, the porous layer, which corresponds to a ceramic separator, may be formed to a thickness of about 4 to 6 µm, and the polyolefin resin layer, which corresponds to a film-type separator, may be formed to a thickness of about 12 to 16 µm. The thicknesses of the ceramic separator and the film-type separator are limited in the above-described ranges, thereby maximizing battery safety without degrading battery performance.

As described above, an electrode assembly and a secondary battery having the same according to the present invention can maximize battery safety without degrading battery performance.

Furthermore, a secondary battery according to the present invention can be excellent in capacity retention rate, thermal exposure characteristic, and mechanical safety.

Although the present invention has been described with reference to certain exemplary embodiments thereof, it will be understood by those skilled in the art that a variety of modifications and variations may be made to the present invention without departing from the spirit or scope of the present invention defined in the appended claims, and their equivalents.

What is claimed is:

1. An electrode assembly for a battery, the assembly comprising:
   a first electrode comprising a first electrode active material and a first binder, wherein the first electrode further comprises 0.1 to 30 wt % of the first binder based on the total weight of the first electrode active material;
   a second electrode comprising a second electrode active material and a second binder, wherein the second electrode further comprises 0.1 to 30 wt % of the second binder based on the total weight of the second electrode active material; and
   a separator between the first and second electrodes, the separator including a porous layer and a polyolefin resin layer, the porous layer having a ceramic component and a third binder,
   wherein the porous layer has a thickness of approximately 4 to 6 µm and the polyolefin resin layer has a thickness of approximately 12 to 16 µm,
wherein the porous layer is formed on the second electrode, and
   wherein the second binder and the third binder are either an aqueous binder or an organic binder and when the second binder is an aqueous binder, the third binder is an organic binder, and when the second binder is an organic binder, the third binder is an aqueous binder.

2. The electrode assembly of claim 1, wherein the porous layer is in contact with the second electrode active material of the second electrode.

3. The electrode assembly of claim 1, wherein the first electrode is a positive electrode including a positive electrode active material and the first binder, and the second electrode is a negative electrode including a negative electrode active material and the second binder.

4. The electrode assembly of claim 1, wherein the polyolefin resin layer is formed of a polyethylene (PE) layer, a polypropylene (PP) single layer or a PP-PE-PP triple layer.

5. The electrode assembly of claim 1, wherein the ceramic component of the porous layer includes at least one material selected from the group consisting of silica ($SiO_2$), alumina ($Al_2O_3$), zirconium oxide ($ZrO_2$), and titanium oxide ($TiO_2$), insulating nitride, hydroxide, and a ketone of each of zirconium, aluminum, silicon, and titanium, and a mixture thereof.

6. The electrode assembly of claim 1, wherein the third binder includes a synthetic rubber latex or an acryl rubber binder with a crosslinking structure.

7. The electrode assembly of claim 6, wherein the synthetic rubber latex binder includes at least one polymer latex selected from the group consisting of styrene butadiene rubber (SBR) latex, nitrile butadiene rubber (NBR) latex, methyl methacrylate butadiene rubber latex, chloroprene rubber latex, carboxylated styrene-butadiene rubber latex, and modified polyorganosiloxane-based polymer latex.

8. The electrode assembly of claim 6, wherein the acryl rubber binder having the crosslinking structure is formed by cross-linking reaction of a polymer or co-polymer of an acryl main monomer with a cross linking co-monomer.

9. The electrode assembly of claim 8, wherein the acryl main monomer includes at least one selected from the group consisting of one alkoxyalkyl acrylate selected from the group consisting of methoxymethyl acrylate, methoxyethyl acrylate, ethoxyethyl acrylate, buthoxyethylacrylate, methoxyethoxyethyl acrylate, and dicyclopentenyloxyethyl acrylate; one alkenyl acrylate or alkenyl methacrylate selected from the group consisting of vinyl methacrylate, vinyl acrylate, allyl methacrylate, 1,1-dimethylpropenyl methacrylate, 1,1-dimethylpropenyl acrylate, 3,3-dimethylbutenyl methacrylate, and 3,3-dimethylbutenyl acrylate; one unsaturated dicarboxylic acid ester selected out of divinyl itaconate and divinyl maleate; one vinyl ether selected out of vinyl 1,1-dimethylpropenyl ether and vinyl 3,3-dimethylbutenyl ether; 1-acryloyloxy-1-phenylethene; and methyl methacrylate.

10. The electrode assembly of claim 8, wherein the cross linking co-monomer includes at least one selected from the group consisting of one alkyl acrylate selected from the group consisting of 2-ethylhexyl acrylate, methyl acrylate, ethyl acrylate, propyl acrylate, buthyl acrylate, octyl acrylate, and iso-octyl acrylate; one alkenyl chloroacetate selected out of vinyl chloroacetate and acryl chloroacetate; one glycidyl ester or ether selected from the group consisting of glycidyl acrylate, vinylglycidyl ether, and acryl glycidyl ether; one unsaturated carboxylic acid selected from the group consisting of acrylic acid, methacrylic acid, and maleic acid; 2-chloroethyl vinyl ether; chloromethyl styrene; and acrylonitrile.

11. The electrode assembly of claim 8, wherein the acryl rubber binder having the cross-linking structure has a 3-dimensional cross-linking structure having 2 to 10 cross-linking points based on 10,000 molecular weight units of a main chain molecule.

12. The electrode assembly of claim 11, wherein the acryl rubber binder having the cross-linking structure has a 3-dimensional cross-linking structure having 4 to 5 cross-linking points based on 10,000 molecular weight units of a main chain molecule.

13. A secondary battery comprising:
   an electrolyte
   an electrode assembly including a first electrode including a first electrode active material and a first binder, a second electrode including a second electrode active material and a second binder, and a separator disposed between the first electrode and the second electrode;

a can accommodating the electrolyte and the electrode assembly, the can including an open end;

a cap assembly disposed at the open end of the can, wherein the separator includes a porous layer and a polyolefin resin layer, wherein the porous layer includes a ceramic component and a third binder, and the porous layer is disposed between the second electrode and the polyolefin resin layer, wherein a thickness of the porous layer is 4 to 6 μm and a thickness of the polyolefin resin layer is 12 to 16 μm, wherein the first binder of the first electrode is 0.1 to 30 wt % based on the total weight of the first electrode active material, and the second binder of the second electrode is 0.1 to 30 wt % based on the total weight of the second electrode active material, wherein the second and third binders are either aqueous or organic binder and when the second binder is an aqueous binder, the third binder is an organic binder, and when the second binder is an organic binder, the third binder is an aqueous binder.

14. The secondary battery of claim 13, wherein the first electrode is a positive electrode and the second electrode is a negative electrode, and wherein the porous layer is in direct contact with the second electrode.

15. The secondary battery of claim 13, wherein the electrolyte includes at least one nonaqueous organic solvent selected from the group consisting of dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), butyrolactone (BL), decanolide, valerolactone, mevalonolactone, caprolactone, n-methyl acetate, n-ethyl acetate, or n-propyl acetate, dibutyl ether, and polymethylvinyl ketone.

16. The secondary battery of claim 13, wherein the electrolyte includes an organic solvent formed by adding an aromatic organic solvent to a carbonate solvent mixed in a volume ratio of approximately 1:1 to 30:1.

17. The secondary battery of claim 13, wherein the electrolyte contains one or more lithium salts.

18. The secondary battery of claim 17, wherein the lithium salts include at least one selected from the group consisting of $LiPF_6$, $LiBF_4$, $LiSbF_6$, $LiAsF_6$, $LiClO_4$, $LiCF_3SO_3$, $LiN(CF_3SO_2)_2$, $LiN(C_2F_5SO_2)_2$, $LiAlO_4$, $LiAlCl_4$, $LiN(C_xF_{2x+1}SO_2)(C_yF_{2x+1}SO_2)$, $LiSO_3CF_3$, and a mixture thereof, wherein x and y are natural numbers.

19. The secondary battery of claim 18, wherein the salts have a concentration of about 0.6 to 2.0 M.

20. The secondary battery of claim 19, wherein the salts are used in a concentration of approximately 0.7 to 1.6M.

* * * * *